March 17, 1953 A. R. ELLSWORTH 2,631,859

PHONOGRAPH RECORD

Filed July 30, 1949

INVENTOR,
ALLAN R. ELLSWORTH
BY
John Flam
ATTORNEY

Patented Mar. 17, 1953 2,631,859

UNITED STATES PATENT OFFICE 2,631,859

PHONOGRAPH RECORD

Allan R. Ellsworth, Los Angeles, Calif.

Application July 30, 1949, Serial No. 107,816

2 Claims. (Cl. 274—42)

This invention relates to phonograph records, and particularly to those records of substantially disc shape, and a method for making the same.

In phonograph records, the most delicate portion is that area commonly designated as the sound groove area. This portion ordinarily occupies a large portion of the total area of the record. It is this portion which must be protected against injury, such as from scratches, nicks, and the like in order that the sound reproduction be as free as possible from extraneous and unwanted noise.

Heretofore the entire surfaces of the record have been substantially planar, the sound groove area forming a part of the friction surface by which the record is rotated. When the record is used in an automatic record changer or the like wherein the records are stacked one on the other, there is danger of damaging the sound groove areas when relative motion between the records occurs. Furthermore, there may be a danger in injuring the record through contact with a turntable.

It is accordingly one object of this invention to provide an improved form of phonograph record to reduce the hazard of damage to the sound groove area. For this purpose, use is made of a phonograph record having a sound groove area of reduced thickness, as compared with other portions of the record. In this manner, the delicate area of the record is out of contact with surfaces with which the record may contact, reducing the hazard of damage to the sound groove area.

In phonograph records it is always desirable to minimize the hazard of slippage while the record is in use. This is important in order that a constant angular velocity be obtained to insure an undistorted reproduction.

It is accordingly another object of this invention to provide a record that minimizes the hazard of undesired slippage of the record while it is in operation. For this purpose, the contacting surface by which the record is primarily rotated is concentrated at the outer periphery thereof. In this manner any torque tending to cause slippage will be retarded by the frictional forces acting at substantially the largest lever arm obtainable.

It is still another object of this invention to provide a record that is sufficiently flexible to resist breakage during handling, but yet is sufficiently rigid to insure proper contact with the rotating surface during operation.

It is still another object of this invention to provide a phonograph record of this character that is simple in structure, but effective in operation.

Still another object of this invention is to provide a record of this character in which the cost of manufacturing the record is substantially reduced, and particularly by reducing the amount of material that is required to form a record of standard dimensions.

In phonograph records it is always desirable to have the starting spiral begin at the outwardmost porton of the record. In this invention, therefore, at least a part of the starting spiral will be located on the elevated rim portion of the record.

It is, therefore, another object of this invention to provide a record that has an elevated rim portion on which at least a part of the starting spiral is located, wherein the contour of the record is such that the cooperating needle is provided with a stable but steep downward traverse to the sound groove area. For this purpose, the tapered portion of the outer rim is slightly curved to provide a convex path for the needle.

It it still another object of this invention to provide a simple apparatus for making this improved record insuring an ample peripheral contacting surface together with a steep but smooth tapered portion leading to the sound grooves.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figures 1, 2:
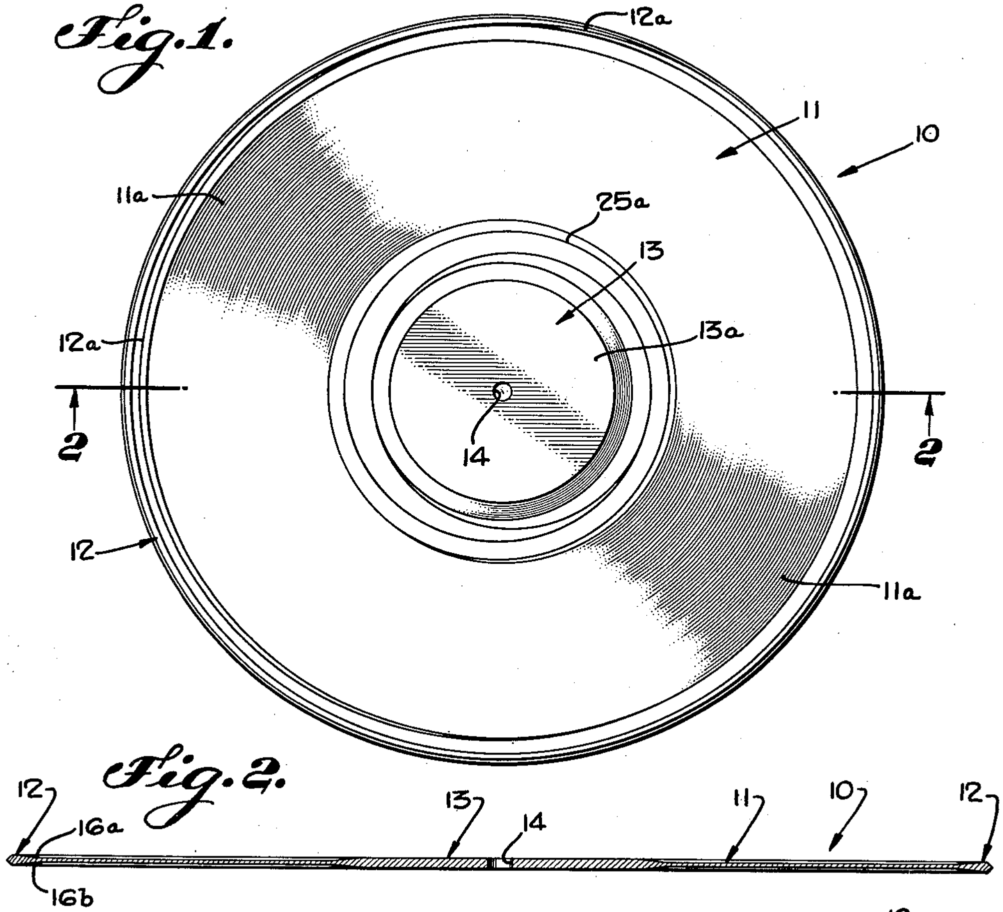
Figure 1 is a plan view of a record incorporating this invention.
Fig. 2 is a sectional view on an enlarged scale taken along the plane 2—2 of Fig. 1.

The record 10, generally of disc configuration, comprises a sound groove portion 11 which may have sound grooves 11*a* and 11*b* respectively disposed on either side of the record. An outer annular rim portion 12 is shown as having starting spirals 12*a* and 12*b* respectively cooperating with the sound grooves 11*a* and 11*b*. An inner or central portion 13 has faces 13*a* and 13*b* conventionally adapted to provide a surface upon which may be secured descriptive labels.

The inner portion 13 is suitably provided with an aperture 14 extending centrally thereof in order to permit the passage of a guiding spindle (not shown).

Figures 3, 4:
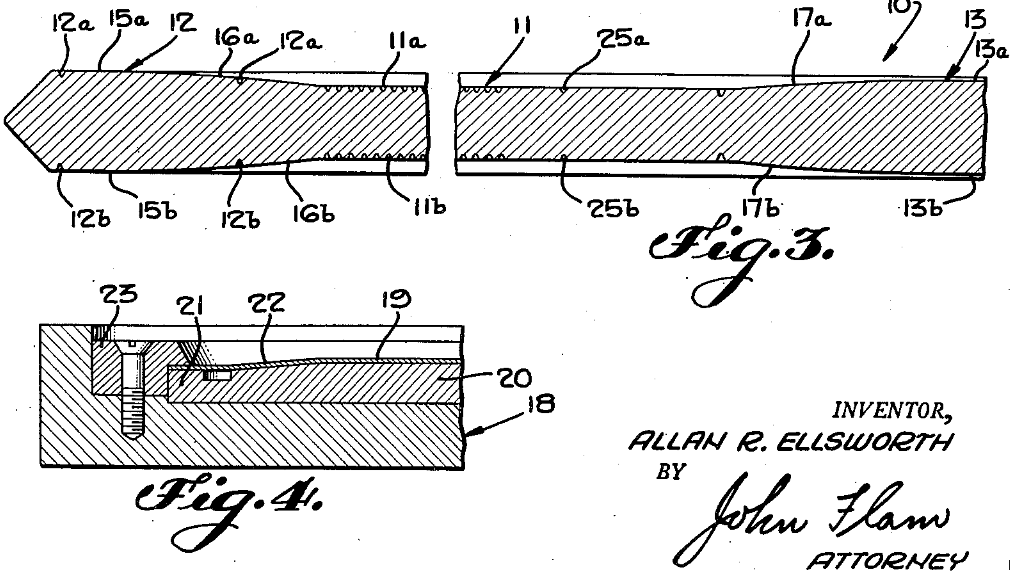
Fig. 3 is a fragmentary sectional view on a greatly enlarged scale showing the particular structure of a record incorporating this invention.
Fig. 4 is a sectional view illustrating in particular the apparatus by which this record may be formed.

As shown most clearly in Figs. 2 and 3, the outer annular portion 12 is provided with substantially plane annular surfaces 15*a* and 15*b* on either side of the record 10. When it is desired to utilize the sound grooves 11*a*, the plane surface 15*b* is adapted to contact a rotating mechanism, such as a turntable.

Adjoining each of these plane surfaces 15*a* and 15*b* is a tapered annular surface 16*a* or 16*b* respectively terminating at the sound grooves 11*a* and 11*b*. The starting spirals 12*a* and 12*b* traverse these tapered portions as it is preferred that the starting spiral be located on the outwardmost portion of the record. In order to insure stability of the needle on this downward traverse, the tapered portions 16*a* and 16*b* are shown as curved, the major portion thereof being convex so that there is but little tendency for the needle to jump the starting spiral 12*a* or 12*b*. The tapered portions 16*a* and 16*b* provide no discontinuities in slope between the plane surfaces 15*a* and 15*b* and the sound grooves 11*a* and 11*b* respectively.

These tapered surfaces converge toward each other in a radially inward direction, and thus the sound groove portion 11 is positioned intermediate the planes defined by the surfaces 15*a* and 15*b*. The surface of the sound groove portion 11 may be about ten one-thousandths of an inch inwardly of the planes defined by the surfaces 15*a* and 15*b*. The cross section of the record is thus of subtsantially channel shape, the sound groove portion 11 defining the bottom of the channel. By this structure, the sound groove 11*b* will be out of contact with the surface by which the record 10 is rotated, protected from possible harm. Similarly, the sound groove 11*a* will be protected from contact with other surfaces, such as when, in an automatic record player or the like, another record is placed on top of the record 10.

That part of the record generally designated as the sound groove portion 11 includes eccentric grooves 25*a* and 25*b* respectively cooperating with the sound grooves 11*a* and 11*b*.

Tapered portions 17*a* and 17*b* are similar to the portions 16*a* and 16*b*, and they lead from the innermost portion of the sound groove portion 11 and terminate at the wider central portion 13.

The inner portion 13 may assist the outer plane surface 15*b* in providing frictional stability, but the outer surface 15*b* being of considerable area and being at a large distance from the center of the record 10 will exert the far greater stabilizing influence to prevent slippage of the record 10 with respect to the rotating surface.

In order to insure that the plane surface 15*b* contacts the rotating mechanism, the flat face 13*b* lies slightly above the plane defined by the surface 15*b*, as the thickness of the central portion 13 is less than that of the outer portion 12 at the plane surface portions. This does not necessarily prevent the face 13*b* from contacting the rotating surface, as the slight force exerted for instance, by the weight of the record or a contacting needle may flex the record 10 so that face 13*b* becomes substantially coplanar with the surface 15*b*. The main purpose of the increased width of the central portion 13 as compared with the sound groove portion 11 is for stabilizing to a large degree the configuration of the record to insure that surface 15*b* contacts the rotating surface. But this increased width of the inner portion 13 does not preclude substantial flexure of the entire record; thus, the record is able to absorb shock in handling and thereby resist fracture.

The manner in which the record may be stamped to this desired configuration, is illustrated in Fig. 4.

One of a pair of die members 18 is shown upon which may be secured the thin copper stamper 19. The record may conventionally be formed by the die members being moved together, one of the record impressions being formed by the copper stamper 19 on plastic material that is placed between the stampers. The general structure of such apparatus is well known, but attention is here drawn to the particular mode of supporting the stamper so that the improved record may be made.

A shim 20 lies between the die member 18 and the stamper 19. The peripheral flange portion 21 of the shim 20 is of reduced thickness corresponding to the increased thickness of the rim portion or outer portion 12 of the record 10. The shim 20 is provided with a tapered surface 22 of frusto-conical form corresponding to the tapered surface 16*a* or 16*b* of the outer portion 12.

The stamper 19 is appropriately secured to the die member 18 to conform generally to the shape defined by the shim 20 by the aid of a conventional clamp ring 23 suitably secured to the die member 18. The stamper will thereby be flexed at its peripheral portions and suitably restrained from returning to its natural plane configuration.

In order to insure that the stamper 19 lies closely against the shoulder or flange portion 21, as well as the tapered surface 22, as pressure is exerted when the die members cooperate to form an impression, an annular recess 24 is provided in the peripheral portion 21 of the shim 20 adjacent the base defined by the frusto-conical surface.

The stamper 19 will not assume exactly the frusto-conical shape of the tapered portion 22, but will be somewhat curved as indicated due to the natural tendency of the flexible stamper 19 to assume a shape in which no slope discontinuities occur. The particular contour of the shim 20 permits a rather steep taper of the desired configuration.

The desired form of the record is thus achieved, there being a substantial flat portion 15*a* or 15*b* and a convex tapered portion 16*a* or 16*b* provided on the record.

It will be understood that the shim 20 may be made integral with the die member 18 and the same desired results achieved.

The inventor claims:

1. In a phonograph record of substantially disc configuration: an inner portion centrally disposed of the record; an outer portion; a sound groove portion disposed between the outer and inner portions; the outer portion having flat surfaces symmetrically disposed on either side of said record, said flat surfaces defining two parallel planes; the outer portion also having symmetrically disposed tapered portions, the tapered portions terminating at the sound groove portion; and the inner portion having a thickness substantially greater than said sound groove portion but less than that of said flat portion of said outer portion, and lying intermediate said planes, the outer portion having an area adequate to provide substantially sufficient frictional torque to eliminate slippage.

2. A phonograph record of disc configuration having an inner portion substantially centrally of the record, a peripheral outer portion, and a sound groove portion therebetween, the sound groove portion having a thickness less than that of said inner and outer portions; the outer portion having a thickness greater than that of said inner portion, the entire record lying within two parallel planes defined by the width of said peripheral outer portion, the outer portion having an area adequate to provide substantially sufficient frictional torque to eliminate slippage.

ALLAN R. ELLSWORTH.

REFERENCES CITED

The following references are of record in the file of this patent:

UNITED STATES PATENTS

| Number | Name | Date |
|---|---|---|
| 946,563 | Rhodes | Jan. 18, 1910 |
| 1,665,759 | Vasselli | Apr. 10, 1928 |
| 2,050,366 | Moss | Aug. 11, 1936 |
| 2,092,880 | Hunter et al. | Sept. 14, 1937 |
| 2,287,240 | Haltenhof | June 23, 1942 |
| 2,346,760 | Kleber | Apr. 18, 1944 |
| 2,503,609 | Barnhart | Apr. 11, 1950 |

FOREIGN PATENTS

| Number | Country | Date |
|---|---|---|
| 124,508 | Austria | Sept. 25, 1931 |
| 561,809 | Great Britain | June 6, 1944 |